March 30, 1965     E. D. McMURRY     3,175,514
APPARATUS FOR GAS LIFT PRODUCTION OF LIQUID FROM WELLS
Original Filed March 5, 1959     5 Sheets-Sheet 1
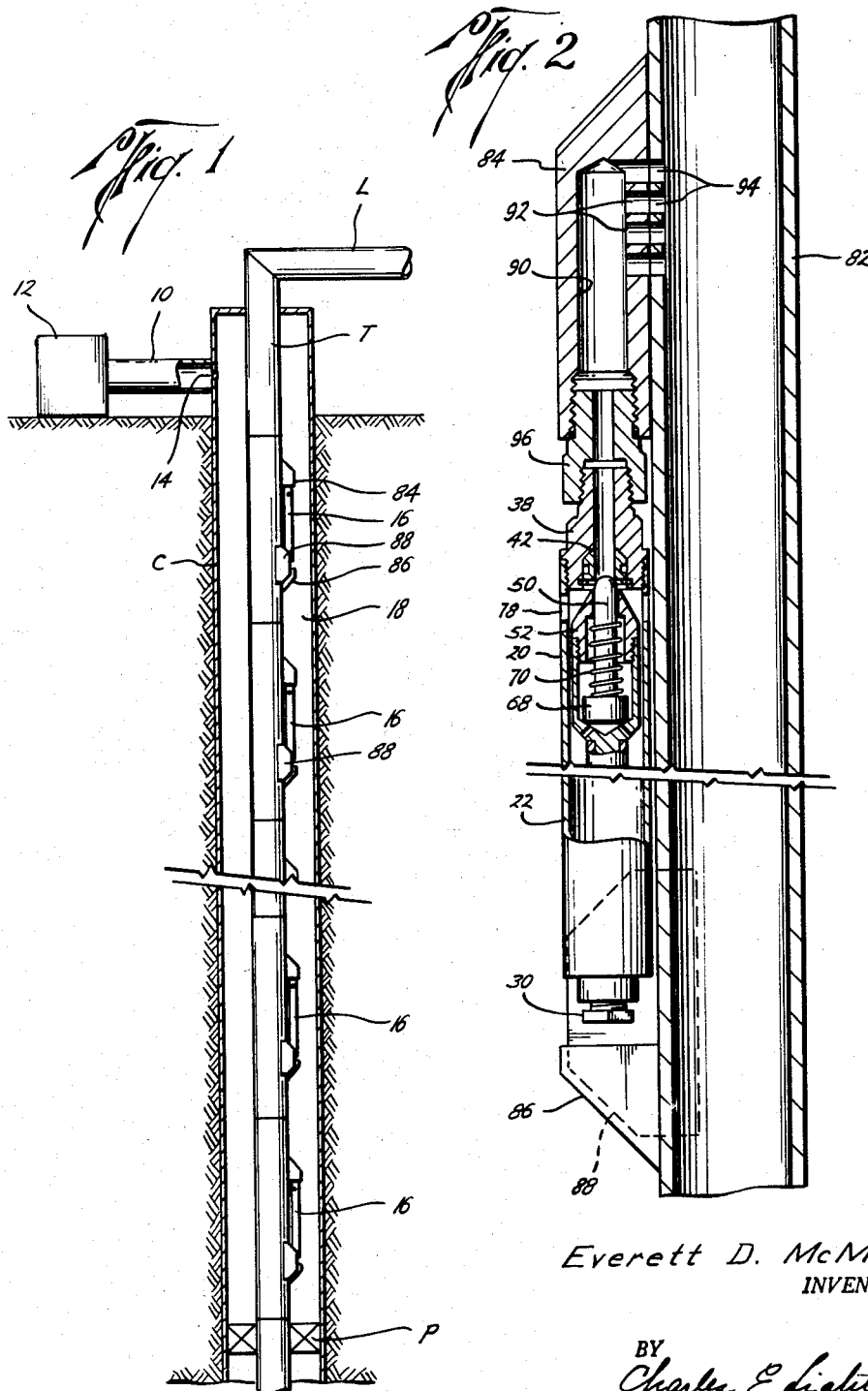
Everett D. McMurry
INVENTOR.
BY
Charles E. Lightfoot
ATTORNEY

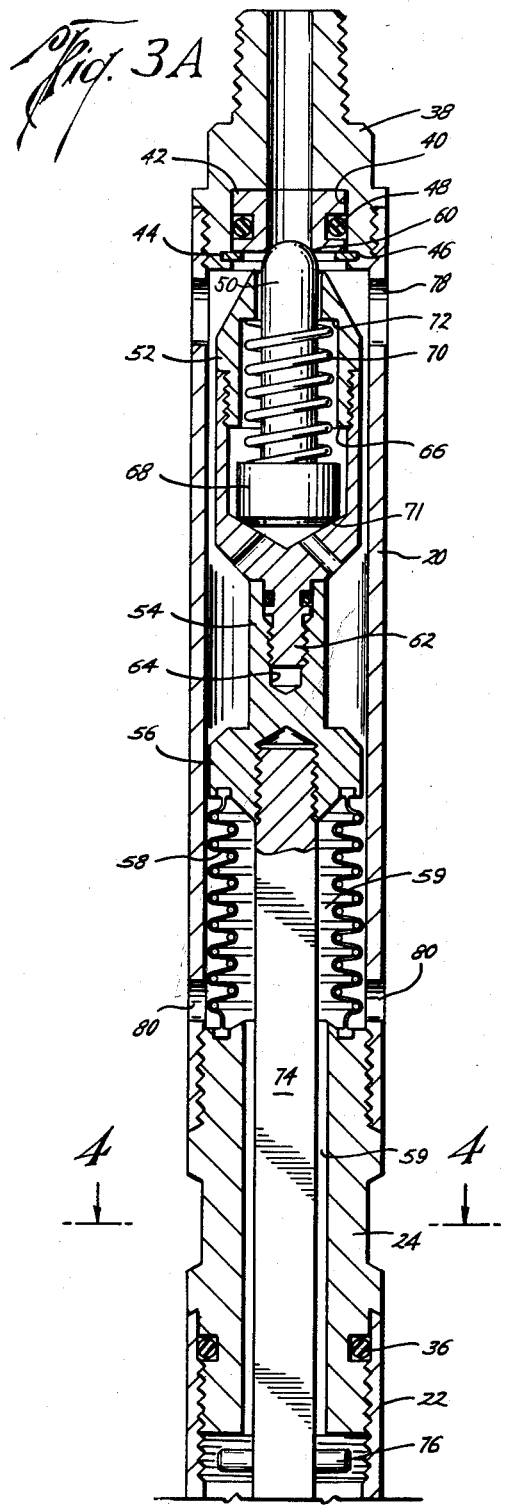

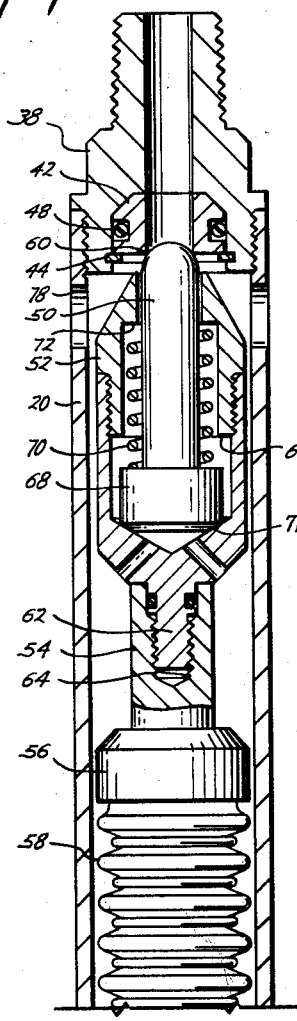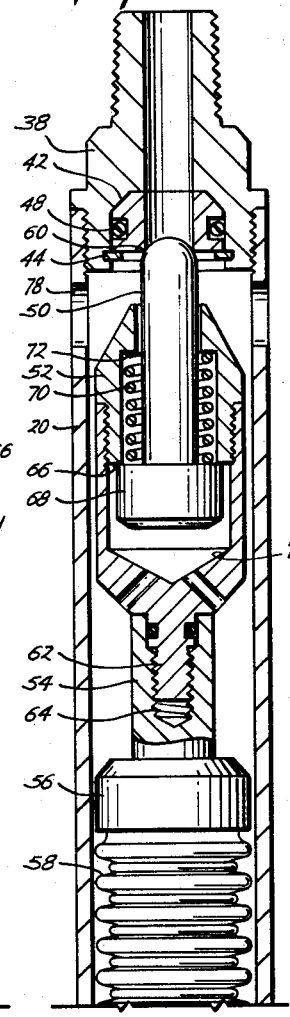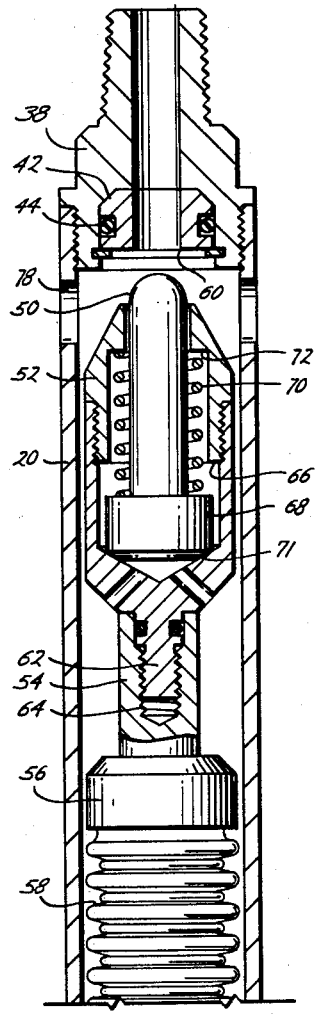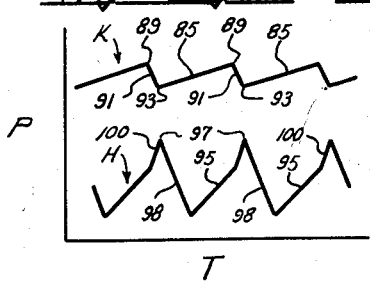
Everett D. McMurry
INVENTOR.
BY Charles E. Lightfoot
ATTORNEY March 30, 1965  E. D. McMURRY  3,175,514
APPARATUS FOR GAS LIFT PRODUCTION OF LIQUID FROM WELLS
Original Filed March 5, 1959  5 Sheets-Sheet 4

Everett D. McMurry
INVENTOR.

BY Arnold & Roylance
ATTORNEY

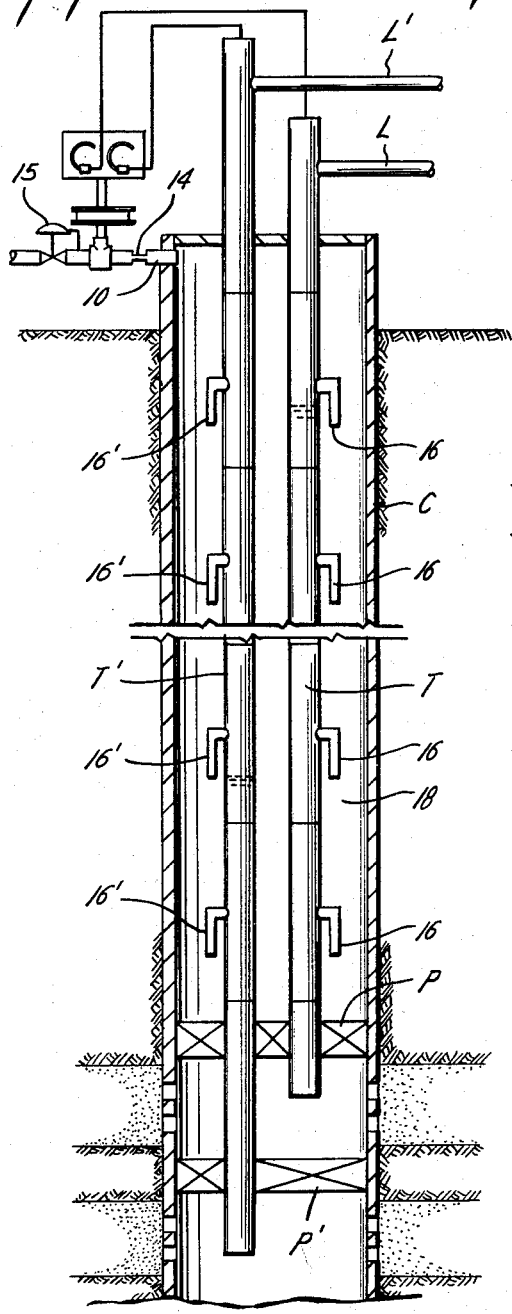
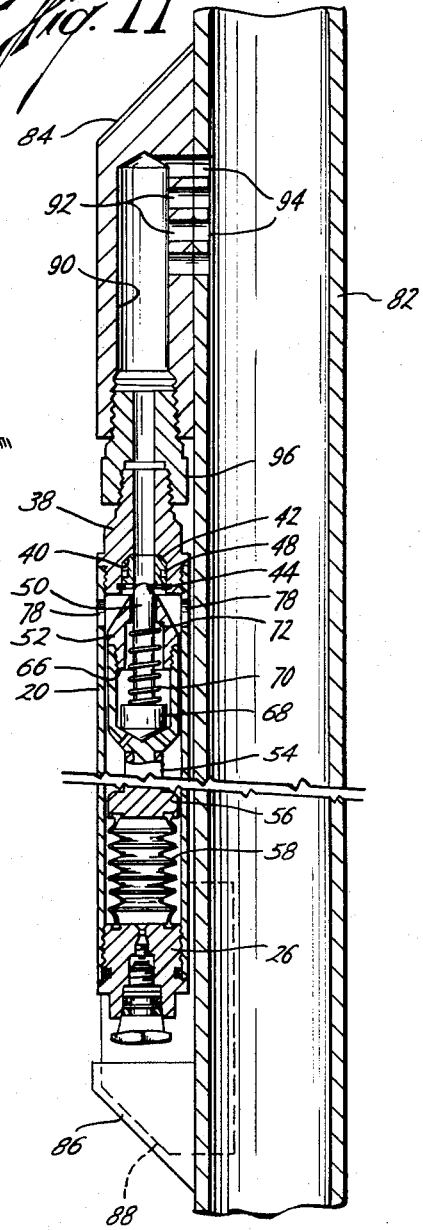
Everett D. McMurry
INVENTOR.
BY
Charles E. Lightfoot
ATTORNEY United States Patent Office 3,175,514
Patented Mar. 30, 1965

3,175,514
APPARATUS FOR GAS LIFT PRODUCTION OF LIQUID FROM WELLS
Everett D. McMurry, Houston, Tex., assignor of one-half to Knud I. Bruun, Houston, Tex.
Continuation of application Ser. No. 797,385, Mar. 5, 1959. This application Jan. 28, 1963, Ser. No. 258,367
33 Claims. (Cl. 103—232)

This application is a continuation from both of my two co-pending applications, Serial Numbers 797,385 and 56,929, said application 56,929, filed September 19, 1960, being a continuation-in-part from said application 797,385, filed March 5, 1959. Both of said applications are abandoned by the filing hereof.

This invention relates to the flowing of wells and more particularly to a system for and method of promoting the production of liquids such as oil from wells by the introduction of gaseous fluid under pressure from the surface, and to a gas-lift valve structure for use in such a system.

In the "gas-lift" art, the "gas" may be a hydrocarbon gas, air or any other gas (though for safety reasons it is preferably one that will not support combustion in the context of its use). In all events, in this specification "gas" should be understood to mean gaseous type fluids generally, and not just hydrocarbon gas or any other particular gas.

In the operation of oil wells, and especially in wells wherein the pressure in the formation is insufficient for the economical operation of the well by formation pressure alone, it is customary to make use of gas-lift mechanism by which gas under pressure may be introduced into the well from the surface to promote the outflow of oil.

The gas-lift method of well operation is usually carried out by connecting into the well tubing a number of gas-lift valves which are operable to permit the inflow of gas under pressure from the interior of a gas injection conduit, usually the annulus between well tubing, well casing, into a production conduit, usually the tubing, at longitudinally spaced intervals to cause an upflow of oil and gas in the tubing. The gas-lift valves used in this method of operation are adjusted to be opened and closed upon the occurrence of approximately predetermined pressure conditions in the tubing and/or casing, so that gas is permitted to enter the tubing only at a location and under pressure conditions to cause an outflow of oil.

In the operation of wells by this method one gas-lift valve in a string may be opened continuously for long periods of "open flow," but more commonly a valve is opened periodically to introduce gas under pressure from the annulus into the tubing. It has been customary heretofore to provide a surface source of gas under pressure from which relatively large volumes of gas at high pressure may flow into the casing to assure the effective operation of the mechanism. Where several wells or several formations in a single well are to be operated in this manner from a single source of supply of gas at high pressure, very large surface reservoirs and compressor equipment of very large capacity are required to furnish sufficient gas for efficient operation.

While the oil may be aerated by the gas injected into the production tubing, and thereby lightened for easier flowing, common gas-lift technique is to introduce slugs of gas in a single bubble to act as a piston lifting a slug of oil, much as a bubble of steam in a coffee percolator lifts water upward in the perculator's tubing.

In one common application of this general production method, gas-lift valves are provided with mechanism by which the valves are held in closed position by a predetermined force and are opened when the pressure in the well annulus exceeds a predetermined pressure. Such valves are often constructed with closed bellows which are filled with gas under pressure and positioned to exert a closing force on the valve and to be acted upon by the pressure in the annulus to open the valve when the pressure in the annulus reaches a predetermined pressure. By the use of suitable timing mechanism for controlling the flow of gas from the surface source of gas under pressure into the well annulus, the opening of valves of this type may be regulated to introduce gas from the annulus into the well tubing at predetermined clock-determined intervals to cause the outflow of oil from the well through the tubing.

At times gas-lift valves are employed which are constructed to open in response to the combined pressure in the well tubing and in the annulus when such combined pressure reaches a predetermined value. By the use of gas-lift valves of this type, the annulus pressure may be maintained at a predetermined value so that when the level of liquid in the tubing rises to a height to increase the pressure in the tubing on the valve by a predetermined amount, the valve will open.

It might here be mentioned that at the time of the filing of the first parent application 797,385, the valves most commonly used in the practice of gas-lift used bellows and/or springs as the pressure responsive means therein, one company commonly using a sleeve instead of a bellows; still others in the art have used diaphragms, Bourdon tubes, pistons, etc.; but the bellows-type valve has been selected for use in illustration here because it is the most commonly used pressure responsive means in the field at the time of this application for patent and it is easily engineered by all those in the art to give the dimensional quantities of movement at preferred spring rates.

The use of the above described method of well operation, as customarily carried out heretofore, with bellows, sleeve or other type valve, is attended by the disadvantage, among others, that the timing of the opening and closing of the gas-lift valves must be carefully regulated in accordance with the amount of oil which is available to be removed from the well, or large volumes of gas at high pressure may be wasted, either in flowing smaller quantities of oil than could be efficiently obtained, or in allowing the gas to enter the tubing when there is no oil to be lifted by the gas. Thus, if the valve opens at a time when no oil is in the tubing above the valve, the gas flows out through the tubing without causing any outflow of oil, and if the valve is opened before the oil has entered the tubing to its highest level in the tubing then the outflow of oil will be less than the amount which could be most efficiently produced by the gas injected.

Also inefficient is the heretofore often unavoidable practice of getting a larger head of oil above the gas injection valve than the gas injected can at its pressure efficiently lift to the surface, with the result that much of the slug of oil slips back down the tubing and is not delivered at the well head.

In gas-lift valve mechanisms of usual design the opening and closing movements of the valve are often relatively slow, so that at the beginning of the opening movement and just prior to the closing of the valve the valve is in a partially opened or cracked condition, which results in "throttling" and the rapid cutting or wearing away of the valve seat and other parts.

When more than one producing formation is produced through a single well, peculiar and unexpected problems arise which are often termed "valve interference," not because the valves physically interfere with one another but because the operation of the valves in one string of tubing in a well interferes with the pressure conditions that would properly operate the valves in another string of production tubing in the same well.

For example, assume two production tubings serving two different oil producing formations in the same well, and all valves are so designed to be opened by annulus pressure; and further assume that one formation produces a large head of oil above the lowermost gas-shift valve more rapidly than the other formation. It is common to experience that the valves in the string producing the faster-flowing formation, open and draw down the annulus pressure too low to permit opening of the valves in the other string, and as the pressure builds up again in the annulus by introduction of surface gas, either the same valve opens again leaving the slower formation not produced at all, or valves in both strings open simultaneously taking gas so fast that there is not enough gas to raise the head of oil in either tubing.

If valves are used in both strings which open in response to pressure in the production tubing, it is certain that valves in both strings will open on frequent occasion at the same time and rob gas from each other, then reducing efficiency of production. If one string of valves open in response to annulus pressure and the other in response to tubing pressure, it is still common to have the tubing-sensitive string use so much gas as to preclude effective operation of valves in the other string, or to experience other forms of valve interference. And if valves in both strings open and close in response to annulus pressure, it is obvious that draw-down of casing pressure because of gas rushing into tubing A, may cause the valve in tubing B to close abruptly short before enough gas to raise the head of oil in tubing B has been injected therein.

In short, multiple completed wells have always been a horrendous headache to gas-lift engineers.

An object of this invention is to produce a valve which effects a snap-acting opening and closing, and this without subjecting the bellows of bellows-embodiments of the invention to the snap action, thereby to lengthen the life of the bellows.

Another object of one embodiment of this invention is to provide a valve for gas-lift operations wherein the valve closure member while in the closed position is exposed to the pressure differential between annulus and tubing to urge it closed and while in the open position is exposed to the pressure of the gas in the valve chassis substantially to the exclusion of producing conduit pressure; and including pressure responsive means responsive to decrease in gas injection conduit pressure to permit termination of gas flow but incapable through its movement in response to increased gas injection pressure of positive movement of said valve member; and wherein the commencement of such termination of gas flow, because of response of said pressure responsive means to decrease in injection conduit pressure producing across said valve member a pressure differential between gas injection conduit pressure and a relatively lower pressure which differential tends to urge the valve member to seat; and urging means operable to urge the valve member toward open position and urging in opposition to said pressure differential thereacross.

For such a novel valve performs the novel and heretofore unappreciated functions thus:

It is incapable of being opened by gas injection conduit pressure alone but rather opens in response to the combination of said urging means and the pressure differential between gas injection conduit and producing conduit; and when once open, it terminates the flow of gas into the producing conduit substantially solely in response to reduction in said gas injection conduit pressure. Applicant believes himself to be the first to accomplish a gas-lift valve with these functions in combination.

Another object of the invention is to provide a method of flowing oil wells by the use of gas-lift apparatus which operates in response to a combination of the pressures in the well tubing and in the casing surrounding the same, the opening of the valve being responsive to production conduit pressure when annulus conditions are right and the closing of the valve being responsive substantially to pressure in the gas injection conduit.

A further object of the invention is the provision of a method of flowing oil wells by the use of gas-lift apparatus in which the opening and closing movements of the gas-lift valves may take place in response to the increase and decrease of the pressures in the well without the use of timing mechanism.

Another object of the invention is to provide gas-lift apparatus for the flowing of wells wherein the gas injection conduit serves as a reservoir for pressurized gas by which the liquid is produced and the valves controlled.

Another object of the invention is to provide for effective gas lift production of multiple formations through a single well and with gas derived from a single conduit, in a manner wherein one production does not ruin the commercial efficiency of the production from another formation through the same well.

Another object of the invention is to provide a gas lift valve which is cocked or loaded for opening, in response directly or indirectly to variations in gas injection pressure but which cannot be opened by gas injection pressure alone.

Still another object of one embodiment is to provide a valve with respect to which, a change in gas injection pressure works to cock or load a resiliently-urging-to-open member to urge the valve open without positively opening it, and which valve, once its resiliently-urging-to-open member is cocked or loaded, is more securely closed by subsequent increases in gas injection pressure.

Still a further object of the invention is to provide a gas lift system wherein no increase in pressure at any point in the gas injection conduit is called for or required after the opening of a down-hole intermitter valve and wherein the valve is closed substantially solely in response to gas injection conduit pressure.

A still further object of the invention is to provide a gas lift system wherein the spread between gas injection pressure upon opening of the down-hole intermitter valve and the gas injection pressure upon the closing of that valve, can be changed at the surface of the ground without pulling or manipulating any of the down-hole apparatus.

The above and other important objects and advantages of the invention may best be understood from the following detailed description in conjunction with the annexed drawings, wherein—

FIGURE 1 is a fragmentary, diagrammatic view of a singly-completed well illustrating the method of a portion of the invention and showing typical arrangement of the apparatus in a well;

FIGURE 2 is a fragmentary side elevational view, partly broken away and partly in cross-section illustrating one embodiment of gas-lift valve of the invention and showing the details of structure and arrangement of its parts and one manner in which the valve may be connected into the apparatus;

Figures 9A, 9B, 9C:
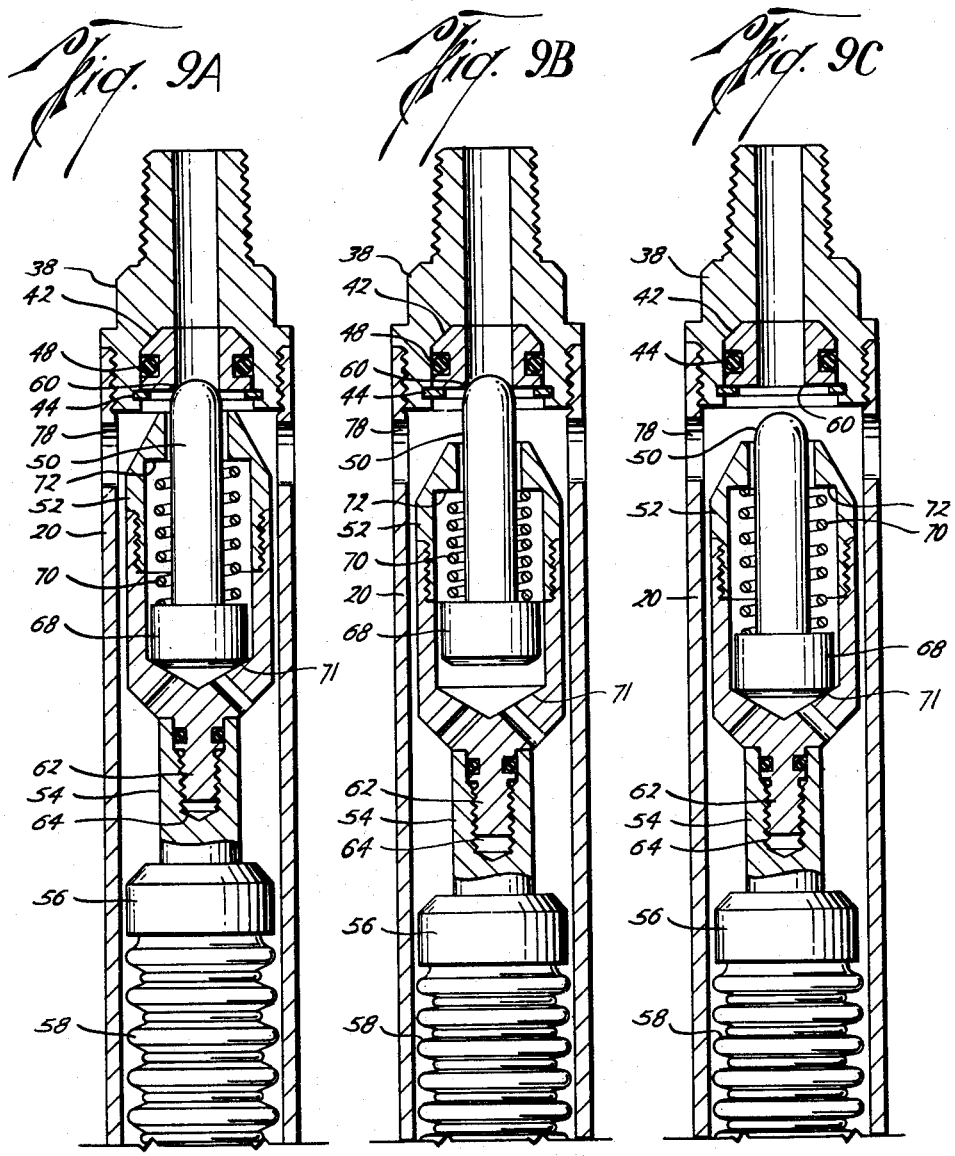

FIGURE 3-A is a fragmentary, central, vertical, cross-sectional view of upper portion of the valve embodiment of FIG. 2, showing details of construction of the valve and its operating mechanism;

FIGURE 3-B is a fragmentary, vertical, central, cross-sectional view of the lower end portion of the valve of FIGURE 3-A, this figure being a downward continuation of FIGURE 3-A;

FIGURE 4 is a cross-sectional view taken along the line 4—4 of FIGURE 3-A, looking in the direction indicated by the arrows;

FIGURE 5 is a fragmentary, vertical, central cross-sectional view of the upper portion of the valve of FIGURES 2 and 3, showing the valve in its closed position;

FIGURE 6 is a view similar to that of FIGURE 5 showing the parts of the valve embodiment of FIGURES 2-5 in the positions which they occupy immediately prior to an opening movement of the valve;

FIGURE 7 is a view similar to that of FIGURE 5 showing the valve in its fully open position;

FIGURE 8 is a diagram showing typical well conditions during the operation of a well by the method and with the value of the FIGURES 2-7 embodiment of the invention.

FIGURES 9A, 9B and 9C are all details with the valve parts in different positions, of a second embodiment and specie of the valve of the invention, shown in a form much like the FIGURE 2-7 embodiment for quicker understanding, and having several special values including some values particularly adapting it to multiple-completed well operations. Like FIGURES 5, 6 and 7 respectively, 9A illustrates the valve parts at normal rest; 9B shows the valve as in the presence of high annulus pressure with bellows retracted and spring cocked; and 9C shows the valve after opening with spring again fully extended.

FIGURE 10 is another schematic illustration of a well and apparatus therein, this time illustrating a dual-completed well producing from two different producing formations.

FIGURE 11 is an elevational section of a third embodiment of the valve, again selected in a form much like the FIGURES 2-7 embodiment for easier description and understanding in conjunction therewith.

Referring now to FIGURE 1 in greater detail, an example of the invention is illustrated in connection with the production of an oil well having a well casing or liner C positioned in the well bore, within which a well tubing T is located, the tubing extending downwardly to a location to permit the outflow of oil from the well through the tubing, and the usual well packer P being positioned in the well to form a seal between the exterior of the tubing and the interior of the casing at a location above the producing formation.

The tubing T is open at its lower end to permit the inflow of oil from the well formation, and is connected at its upper end to a suitable outflow line L through which the oil is conducted to any desired location for storage or other disposal. The casing C is closed at its upper end by a casing head structure of conventional design and is provided with an inlet pipe 10, which is in communication with the interior of the casing and which leads to a suitable source of gas under pressure, such as a pressure tank or compressor, generally designated 12, from which gas at high pressure is supplied to the casing. The inlet pipe 10 has a choke 14 therein, by which the inflow of gas into the casing may be regulated.

The annulus 18 between the casing C and tubing T located above the packer P thus forms a gas reservoir or pressure chamber 18 surrounding the tubing T, within which the pressure may be maintained at any desired value.

For the purpose of introducing gas under pressure from the casing into the tubing at various levels, a number of gas-lift valves, generally designated 16 are connected into the tubing T at longitudinally spaced locations within the pressure chamber or annulus 18 of the casing, which valves are adjusted to open and close upon the occurrence of predetermined pressures in the tubing and casing.

In the FIGURE 10 illustration, two strings of production tubing T and T′ are located in the same well, with the lower ends thereof in communication with two different producing formations. The lower end of production tubing T′ is isolated by a packer P′ from the producing formation thereabove; and the lower end of the tubing T is isolated from the annulus 18 thereabove by the packer P.

Those familiar with the art are aware that the packers may be arranged so that the production is through the annulus 18 and one of the tubings of FIGURE 10, or the tubing of FIGURE 1, used for gas injection. But it is most common practice today to operate wells in the arrangement illustrated. The significant point, however, is that the casing (or open well bore in casingless wells) taken in conjunction with the tubings, together define conduits for gas injection and for production from each producing formation.

As further seen in the FIGURE 10 illustration, the two producing tubings T and T′ are connected at their upper ends to suitable outflow lines L and L′ through which the oil is conducted to any desired location for storage or other disposal. The casing C is closed at its upper end by a casing head structure of conventional design and is provided with an inlet pipe 10 in communication with the annulus 18 and with a suitable source of gas, from which gas at high pressure is supplied to the casing, when desired through a pressure reducing regulator 15 of usual construction.

The choke 14, in both the FIGURE 1 and FIGURE 10 applications of the invention, may be either in addition to or in lieu of other surface control of gas, though it is noted that no timer is required for the practice of this invention.

For the purpose of introducing gas under pressure from the annulus into the inner tubing or pipes T and T′ (or just T as the case may be) at various depths in the well, a number of gas-lift valves, generally designated 16 and 16′ are connected into the tubing T and T′ at longitudinally spaced locations within the pressure chamber or annulus 18, which valves are adjusted to open and close upon the occurrence of predetermined pressures in the tubing and annulus 18.

The valves 16 and 16′ are preferably of a type, such as those described hereinafter, designed to open in response partly to gas injection conduit pressure and partly to production conduit pressure, the valve being cocked or set in response to change in gas injection conduit (annulus) pressure and then actually opened either totally (in the FIG. 9 embodiment) or partly and sometimes (in the FIGS. 3-7 embodiment) in response to production conduit pressure.

Valves constructed and adjusted to intermittently open admitting gas to the well tubing and then close again, including the valves of FIGURES 3-7 and 9, are sometimes referred to in the art as intermitter valves and the method of operating a well by the use of such valves is known as the intermitting method.

In the FIGURES 3-7 example of a valve embodying the invention, the valve comprises an outer casing, housing or chassis 20-22 formed of upper and lower tubular sections 20 and 22 respectively, which are threadably connected together by means of a tubular coupling element 24. The lower section 22 is closed at its lower end by means of a screw plug 26 which has a central passageway 28 therethrough as best seen in FIG. 3B, and is provided with suitable screw fittings, such as those indicated at 30 and 32 which may be removed to permit the lower section to be charged with gas under pressure. Suitable seal forming elements 34 and 36 are provided forming fluid tight seals between the lower chassis section 22 and the plug 26, and between the lower chassis section 22 and the coupling element 24, respectively.

At its upper end the upper chassis section 20 is provided with a tubular coupling element 38 threadably attached thereto, and which has a lower end counterbore 40 opening into the interior of the upper chassis section 20 and within which an annular valve seat forming element 42 is positioned. The seat forming element may be retained in the counterbore by means of a snap ring 44 releasably fitted into an internal groove 46 provided for the same in the coupling element 38. Suitable seal forming means, such as the O-ring 48 is disposed in a groove provided for the same in the seat forming element to form a fluid tight seal between the seat forming element and the coupling element 38.

In the valve embodiments illustrated in FIGS. 3, 5, 6, 7 and 9, within the upper section 20, a valve 50 is movably carried in a valve carrier or cage 52 which is attached to a stem 54 on a head element 56 which is mounted on one end of an expansible actuator element or bellows 58 whose other end is attached to the upper end of the coupling 24. The bellows 58 thus forms wtih the coupling 24 and the lower section 22 an expansible pressure chamber or dome, generally designated 59 in FIGURES 3A and 3B, which may be filled with gas at any desired pressure to urge the valve 50 toward the valve seat 60 of the seat forming element 42.

The valve member actuator, which is the carrier or cage 52 in the embodiment illustrated, may be formed as such cage in tubular sections threadably connected together and provided at its lower end with a downwardly extending, externally threaded projection 62 threadably received in an internally threaded counterbore 64 in the upper end of the stem 54.

In the embodiment shown in FIGURES 3, 5, 6, 7 and 11, the cage 52 has an internal, downwardly facing, annular shoulder 66 positioned for engagement with an external enlargement 68 formed on the lower end of the valve 50 to limit independent movement of the cage in a direction away from the seat 60 relative to the valve 50.

An urging means such as a pressure-charged bellows or the coil spring 70 may surround the valve 50 in the cage, and be seated at one end on an engagement means which may take the form of an internal annular shoulder 72 formed in the cage and at its other end on the external enlargement 68 to yieldingly hold the valve in its lowermost position in the cage, with the enlargement 68 abutting a cooperating abutment or engagement portion 71 of the cage or actuator 52. It is apparent that the abutment 71 is in fact the actuator means for closing the valve, and hence it is sometimes convenient to refer to such abutment 71 also as an actuator or actuator means. The upper end portion of the valve 50 extends beyond the upper end of the actuator 52 in position for engagement with the seat 60 when the valve is closed.

The bellows 58 is of conventional construction and in the FIG. 3 embodiment is suitably secured to the head 56 and coupling element 24, as by means of soldering or otherwise, to close the ends of the bellows. In the FIG. 11 embodiment, which in many applications, is less desirable, the bellows 58 is secured to the head 56 and screw plug 26.

Conveniently, an inner stem 74 may be attached to the head 56 which stem extends through the interior of the bellows 58 and coupling 24 and is provided at its lower end with a cross pin 76, as shown in FIGURE 3A which is engageable with the lower end of the element 24 to limit the amount of extension of the bellows when the upper section 20 of the valve casing is removed in disassembling the device.

The stem 74 may extend downwardly, as seen in FIGURE 3B, with its lower end positioned for contact with the inner end of the screw plug 26 when the stem has been moved to its desired full-open (in the drawing, lowermost) position, and the screw plug 26 and stem may be formed of suitable magnetic materials to cause the stem to be held against upward movement by a predetermined magnetic force. The valve seat forming element 42 and valve 50 may also be formed of suitable magnetic materials to cause the valve to be held in closed position by a predetermined magnetic force if desired.

Note now the valve embodiment of FIGURE 9, wherein this point is illustrated:

The internal shoulder 66 in the cage 52 may be omitted, if desired, in which case the pressure in the casing annulus acting upon the bellows 58 compresses the spring 70 to apply a force to the valve tending to move the valve toward open position, but the valve will not be opened by such compression until the pressure in the tubing reaches a predetermined value.

By the omission of the shoulder 66 the valve carrier or cage 52 is, of course, prevented from positive engagement with the valve member 50.

It is significant to note in that arrangement and equivalent structures, the travel of the cage 52 in the direction away from the valve seat 60 may be limited to the extent desired by dimensional choice, as for example to the distance between the stem 74 and the plug 26 illustrated in FIGURE 3B so that no amount of external pressure on the bellows 58, taken alone, can by any means positively or forceably remove the valve 50 from its seat.

Rather, increases in pressure on the bellows 58 effective to move the carrier 52 downward, operate to compress, load or cock the resilient spring 70, but so long as the pressure differential across the valve 50 (plus or minus gravity on the member 50, depending upon the orientation of the assembly) produces greater closing force than the spring 70's opening force, the valve 50 remains closed.

It is similarly apparent that if the force of the spring 70 is not sufficient to overcome the force of the pressure differential across the valve member 50, the valve remains closed no matter how high the pressure on the outside of the bellows 58 may be raised—unless and until the production conduit pressure rises enough to decrease the differential pressure across the valve member 50 sufficiently to permit the spring 70 to open the valve. Hence the valve is truly responsive not just to pressures on the exterior of the bellows, but to that in combination with production conduit pressure in the channel in the coupling element 38; for that combination determines the pressure differential across the valve 50 which works against the force of the spring or other urging means 70 to determine opening of the valve 50.

The upper section 20 has suitable openings, such as those shown at 78 and 80 to permit the free passage of fluid between the interior and exterior of the section. As illustrated, for purposes of a preferred embodiment of the invention, the openings 78 total much greater cross sectional area than the conduit within the element 38, thus assuring that even when the valve is open the interior of the tubular section 20 remains at substantially annulus pressure in spite of gas flow through element 38 into the tubing, and is substantially unaffected by variations in pressure within the production tubing excepting as the entire surrounding annulus pressure is drawn down by passage of gas into the tubing. It follows that the pressure responsive means, the bellows 58 in the illustrated embodiment, operates to terminate the gas flow into the tubing in response to annulus pressure decrease, in this embodiment by moving the engagement portion 71 to drive the valve member 50 home to seat.

Convenient means may be provided for attaching the valve assemblies to the strings of production pipe or tubing T and T'. Such means may be as taught in Howard et al. 2,664,162 and McGowen et al. 2,679,903 or may take other forms such as those illustrated herein.

Tubular sections such as that generally indicated at 82 in FIGURE 2, may be adapted to be connected into the tubing string or strings in the usual manner, as by means of threaded connections, not shown, each of such tubular sections having longitudinally spaced, laterally projecting, upper and lower lugs 84 and 86, respectively, thereon, into which the valve assembly is fitted. The lower lug 86 is provided with guard plates, such as those shown at 88 in FIGURES 1 and 2, which form a socket-like structure with the lug, into which the lower end of the valve assembly extends.

The upper lug 84 has a central, longitudinal, downwardly opening counterbore 90 and is provided with openings 92 in communication with the interior of the counterbore and which lead to the interior of the tubing string through openings 94 in the tubular section 82.

The coupling element 38, at the upper end of the valve assembly is connected in communication with the interior of the counterbore 90 by a coupling element 96 threadably connected thereto and which is threadably extended into the counterbore.

When valve assembly is thus mounted on the tubular section, the assembly is substantially parallel to the axis of the section in a position to be protected by the lugs 84 and 86 against damage due to contact with obstructions or irregularities in the well during the insertion of the tubing string into or its removal from the well.

It might be mentioned that frequently, a check valve (not a part of this invention and hence not illustrated) is included in the path between the coupling element 38 and the tubing T, intended to check flow from tubing to casing while permitting flow from casing to tubing. However, this check valve does not prevent the exposure of the top of the valve member 50, when in closed position, to tubing pressures, because always either the check valve of the intermitter valve 16 is less than perfectly tight. Accordingly, if the check valve leaks a little it permits the conduit within element 38 to assume tubing pressure; and if the intermitter valve 16 leaks a little bit it passes a mite of gas into the conduit within element 38 so that pressure there rises to keep pace with tubing pressure increase, gas bleeding from within element 38 through the check valve into the tubing if pressure within element 38 ever gets above tubing pressure. These facts being so, the further description of this invention need make no mention of whether such a check valve is used or not. For in normal operation the check valve does not change the function of the system.

It is apparent that, when the valve 50 is open, gas under pressure is admitted into the tubing string through openings 78, valve seat 60, coupling elements 38 and 96, counterbore 90 and openings 92 and 94, and when the valve is closed the inflow of gas from the casing into the tubing is shut off.

It is also apparent that in the embodiments illustrated the bellows 58 coupled with the cage 52 together constitute a pressure responsive means, that has an engagement or abutment portion 71 capable of engagement with the valve member 50 to urge it toward the closed position.

Consider now the difference between the valve embodiment of FIGURE 3 and the valve embodiment of FIGURE 11. In the FIGURE 3 embodiment, there is in addition to the volume of the bellows proper, a large dome or chamber within lower section 22 which has been described as occupied only by compressible fluid, i.e., gas. Hence, a given amount of collapse of the bellows, such as may be necessary to open the FIGURE 3 embodiment, effects only a very slight increase in bellows pressure, which means that the "spread," i.e. the difference between valve opening and closing pressures is a function primarily of the ratio between valve seat area and bellows area (which is less than 1).

But in the FIGURE 11 embodiment, the volume of gas charge within the bellows does not include the dome volume, and hence, a similar amount of collapse of the bellows effects a larger percent reduction in volume of gas charge within the bellows, and this of course means a greater increase in bellows pressure per unit of bellows collapse. Thus, a FIGURE 11 valve, charge with 600 p.s.i. and thereby effective to close at 600 p.s.i. annulus pressure, may be designed to have an opening stroke sufficient to raise the bellows pressure to 650 before the shoulder 66 engages the valve member 50's enlargement 68. Such a valve will normally have a minimum spread of 50 p.s.i., for it cannot open until the annulus pressure is 650 so as to cause the shoulder 66 to engage, and it cannot close until the annulus pressure has decreased to 600 p.s.i. since any pressure greater than that maintains the valve member 50 off its seat.

It is apparent that rather than add larger or smaller lower tubular sections 22 and thereby vary volume of the operating bellows-pressure-charge, a single large size lower tubular section 22 may be used on valves intended for a wide variety of "spreads," and non-compressible liquid may be added to the pressurized chamber 59 so as to limit the compressible volume of a valve of the FIGURE 3 embodiment, to something comparable to or less than the valve of the FIGURE 11 embodiment.

A similar result, spread adjustment, is of course effected by adjusting the stroke of the valve between rest position of FIGURE 5 on the one hand, and shoulder engagement position of FIGURE 6 on the other, since an increase in the stroke of the bellows before shoulder engagement obviously increases the bellows pressure build-up before the valve opens.

Another adjustment to the spread can be effected by changing the magnetic force tending to hold the valve open when once opened, such as that above discussed as usable between the stem 74 and the plug 26.

*Operation*

In the operation of the apparatus, with the valve 50 in closed position, there is a force exerted by the pressure of gas in the pressure chamber or dome 59 urging the abutment or engagement portion 71 of the valve carrier or cage 52 in a direction to close the valve, and a force exerted by the pressure of gas in the annulus on the bellows 58, tending to compress the bellows thereby to move the valve cage in the other direction to compress the spring 70 to urge the valve 50 toward open position. There is also a closing force exerted on the valve by the pressure of gas in the annulus and hence in the chassis or housing 20 and an opening force exerted on the valve by the pressure of the column of fluid in the production tubing T and T' above the level of the valve. The direction of and role of gravity and frictional forces is obvious and hence these forces are disregarded in the further discussion.

Assuming that the valve is in closed position, and that a column of fluid is present in the tubing above the level of the valve which is exerting a certain opening pressure on the valve, but that the combined pressure of the gas in the pressure dome 59 and the closing pressure exerted on the valve by the gas in the annulus 18 between the casing C and the tubing T' and/or T is sufficient to hold the valve closed, then upon the admission of additional gas under pressure into the annulus 18 from the source 12 through the choke 14, the pressure in the casing increases until it exceeds the pressure in the dome 59, by an amount sufficient to cause the bellows 58 to contract, and the cage 52 is moved away from the valve seat 60 to compress the spring 70.

In the embodiment of FIGURES 2-7 and 11, when the cage 52 has been moved away from the valve seat 60 until the internal shoulder 66 of the cage is in engagement with the external enlargement 68 of the valve member, a further increase in the pressure of gas in the annulus combined with the opening pressure on the valve member 50 of the column of fluid in the tubing causes the valve member to be moved away from the valve seat. As soon as the valve is in a partially open or cracked condition, fluid from the annulus may enter the tubing through the valve seat 60 and element 38, which as illustrated in the drawings have a smaller cross-sectional flow-path area and thus greater gas-flow impedance than the openings 78 through which annulus pressure is transmitted to within the housing 20. Thus it follows that the pressure in the annulus is equalized on all sides of the valve member 50, and the valve is suddenly moved with a snapping action to its fully open position by the spring 70.

With the valve in open position, gas flows from the annulus 18 into the tubing T or T' to move the column of liquid in the tubing above the valve upwardly.

The upward flow of gas in the tubing when the valve 50 is open causes a reduction of the pressure of gas in the annulus until the pressure in the annulus falls to a point at which the bellows 58 is expanded to move the cage 52 (including its engagement portion 71) toward the valve seat 60. Note that tubing pressure has no significant bearing upon the action of the bellows 58, rather only the valve chassis pressure here controls. When the valve has been moved with the cage 52 toward the seat a sufficient distance to nearly close the valve there is a decrease in pressure on the downstream side of the valve member 50 thereby giving rise to an increase in the net closing force thereon, so that the final closing of the valve takes place suddenly with a snapping action. Because of the sudden opening and closing movements of the valve, it is apparent that the valve does not remain in a partially open or cracked condition and does not chatter as is common with other valves; so excessive wear or cutting away of the valve and valve seat due to entrained abrasive materials and the cutting capacity of throttled gas does not take place.

Perhaps more important, the snap action is accomplished in the valve member, without the need of snap or other sharp or vibratory movement of the bellows proper, and chatter is eliminated, thus giving long life to the bellows in those valves using that form of pressure-responsive means.

The spring 70 is often of light weight, since its function is merely to move the valve to its fully open position after the initial opening movement of the valve has taken place and the closing force exerted by the pressure of gas in the annulus has been removed. This spring may, under some conditions be omitted, in which case the movement of the valve to its fully open position takes place under the influence of gravity after the initial opening movement has been accomplished by the bellows 58. The strength of the spring 70 may also be increased in the event that it is desired to cause the valve to be opened by direct action of the bellows without or with less snap action.

The spring 70 may be made so stiff that when the differential between the pressures in the casing and tubing is less than the force of the spring, the valve moves with the bellows without compressing the spring. By this means the valve may be used for either intermitting or continuous flow depending on well conditions.

The strength of the spring 70 also may be varied in accordance with the differential in pressure which may exist between the pressure in the casing and in the tubing to permit the operation of the valve in a manner to cause intermittent or continuous flow of the well in accordance with well conditions and production demands.

FIGURE 8 illustrates diagrammatically the operation of the apparatus of the invention embodiment of FIGURES 3 through 8 under typical conditions. In this diagram, the variation in the pressure of the gas in the annulus 18 during the operation of the apparatus is graphically shown by the line P, while the corresponding variations in the pressure of fluid in the production tubing T is indicated by the line H. From an examination of the curves thus presented in FIGURE 8 it is seen that, under typical operating conditions, the pressure in the annulus rises as the pressure in the tubing increases until the combined forces resulting from pressure in the annulus 18 and tubing T reaches a point at which the valve opens, whereupon the pressure in the tubing rises as gas flows from the annulus 18 into the tubing T and the pressures in the annulus and tubing then fall rapidly to a point at which the valve may close.

When the pressure differential across valve member 50 is sufficient to hold it on seat against both gravity and spring force, to compress the bellows 58 the pressure in the annulus must be increased to exceed the sum of the pressure in the dome 59 and the force in the spring 70. In the embodiment of FIGURES 2-7 with the shoulder 66, the valve may then be opened by further annulus pressure sufficient to overcome the pressure differential across the valve; but in the embodiment of FIGURE 9 the valve may then be opened only by increase in production tubing pressure's operating to reduce the pressure differential across the valve member 50.

By way of operating example of the FIG. 3-7 embodiment, assume that a one square inch effective area of the bellows 58, when the valve is open, is five times the cross-sectional area of the opening through the valve seat 60, and the pressure in the dome or pressure chamber 59 is 500 pounds per square inch, disregarding such factors as inherent spring strength in the bellows, gravity and friction, the pressure in the annulus must be increased to exceed 625 pounds per square inch before the valve will open with no pressure being exerted on the valve from the production tubing side.

The pressure in the annulus under these conditions is exerting a closing force of 625 pounds per square inch times ⅕ sq. in. or 125 pounds of force on the valve member to hold the valve closed. The 500-lb.-charged bellows is compressed with an equal 125 lb. force derived from 125 lbs. of pressure differential operating on its one square inch so that the internal shoulder 66 of the cage 52 engages with the external enlargement 68 of the valve 50, the spring 70 being thereby compressed. Upon further increase in annulus pressure and resulting further compression of the bellows the valve is cracked or partially opened admitting annulus pressure to all sides of valve member 50, whereupon the closing force exerted on the valve member by the pressure of gas in the annulus is removed and the valve member is snapped to its fully open position by the spring 70. With the valve thus opened gas under pressure flows from the annulus into the tubing to lift the column of fluid therein.

The 625 plus pounds per square inch required in this example to open the valve with no liquid column in the tubing above the valve is reduced in proportion to the pressure exerted on the seat end of valve member 50 by the pressure head in the tubing at the time that the valve opens.

It is quite apparent, however, that the system may be adjusted for normal operation without engagement of the shoulder 66 and enlargement 68 or with the valve carrier 52 not having such a shoulder 66 as illustrated in the FIGURE 9 embodiment of the invention. In such systems the tubing pressure must rise sufficiently to reduce the net pressure-differential-across-the-valve-derived closing force to less than the gravity-plus-spring-70 opening force before the valve opens, and the opening then is responsive in part to both tubing and annulus pressures. It then cannot open without annulus pressure to compress the bellows (incidentally cocking the spring); it then also does not open without tubing pressure to counterbalance at least part of the pressure-derived closing force.

When the valve of whatever embodiment is open the outflow of gas from the annulus 18 into the tubing T results in a rapid decrease in the pressure in the annulus 18. This decrease in pressure allows the bellows to again expand, causing the engagement portion 71 of the cage 52 to move the valve 50 toward the seat 60; and when the valve reaches a position in relation to the valve seat to cause a decrease in the pressure on the downstream side of the valve member 50, the valve is snapped shut.

In the diagram of FIGURE 8 the pressure P in the casing and in the tubing is plotted against the time T, the portions 85 of the pressure curve K representing periods during which the pressure in the annulus is increasing, the peaks 89 of the curve representing the points at which the valve opens, and the portions 91 representing the short periods during which the pressure in the annulus falls off while the valve is open. The closing of the valve is represented on the curve K by the low points 93 thereon.

The rising of the column of fluid in the tubing during the closed periods of the valve is represented by the portions 95 of the tubing pressure curve H, and the portion 100 represents the increase in pressure in the tubing while the valve is open. The peaks 97 represent the points at which the valve closes while the portions 98 of this curve represent the falling off of the tubing pressure after the valve is closed.

During the time that the valve is open, as represented by the portions 91 of the curve K, the pressure in the annulus is falling off rapidly, while the pressure in the tubing rises sharply, as represented by the corresponding portions 100 of the curve H.

It is apparent that by selecting the size of the choke 14, the rate at which gas under pressure flows into the annulus from the source 12 may be controlled as desired to regulate the timing of the valve in conformity with the amount of fluid which the well is capable of producing, and the annulus 18 serves as a gas storage facility, often the only one needed.

With particular reference to the valve of FIGURE 9, the spring strength is the direct measure (plus or minus gravity on the valve member 50) of the differential between annulus pressure and tubing pressure at the time of opening of the valve. This differential is changeable by simply changing the spring rate of the spring used. But contrary to other valves wherein this differential is obtained by a spring, the spring 70 does not in any valve of this invention make the valve throttle or make it necessary to generate a closing action of the valve by any degree of response to tubing pressure differential from annulus pressure.

In accordance with the FIGURE 9 embodiment of this invention, tubing-annulus differential pressure opens, but annulus pressure only (subject of course to friction, gravity and throttling effects at the instant of closure) closes the valve.

During the process of annulus pressure draw-down as gas flows through the open valve, in all the embodiments illustrated the carrier 52 moves the valve member 50 toward the seat 60 with the spring 70 fully extended and thus at minimum force—and this is a preferable arrangement for the spring. Just prior to closure of the port in the seat 60, throttling commences, decreasing downstream pressure, thereby giving rise to a pressure differential across the valve member 50 which snaps the valve 50 securely onto its seat 60 against the yield of the spring 70, thus snapping the valve closed immediately upon the commencement of throttling.

By way of example of the method in which the FIG. 10 embodiment of the invention may be used in the production of oil from two zones in a well, assume the valves to be positioned in the well tubing, as shown in FIGURE 10, the pressure in the bellows 58 of each valve being adjusted so that the closing force exerted thereby is greater than the pressure exerted by the bellows of the next lower valve. Thus, the bellows of the uppermost valve of the tubing T may, for example, be loaded to exert a pressure of 650 pounds per square inch, the bellows of the next lower valve being loaded to exert a pressure of 640 pounds per square inch, and so on down the string the bellows of each valve being loaded to exert a pressure less than the next valve above. (This step-down offers some installation design value and is commonly used but is not necessary practice.) The valve mechanisms on the tubing T' may also be similarly set for closing pressures which decreases in descending order downwardly and these closing pressures may be the same as or different from the closing pressures of the valve mechanisms on the tubing T.

With the valves thus set, gas under pressure may be introduced into the annulus 18 to provide a pressure therein somewhat higher than the closing pressure of the bellows of the uppermost valve, such, for example as a pressure of 675 pounds per square inch, whereupon all of the bellows are compressed to apply pressure to the springs 70 to exert an opening force on the valves.

With the system thus arranged and conditioned for operation, it is apparent that oil entering the casing from the formation located between the packers P and P' rises in the tubing T until the pressure exerted by the oil therein is sufficient to cause one or more of the valves in the tubing to open, whereupon gas under pressure in the annulus 18 may enter the tubing T beneath the oil to cause the oil to flow upwardly out of the tubing. Similarly, oil entering the casing from beneath the packer P' will enter the tubing T' until the column of oil therein rises to a height therein to exert sufficient pressure to open one or more of the valves on the tubing T', whereupon gas under pressure will flow into the tubing to cause an outflow of oil from the tubing T'. It is also evident that should the production of oil from the formations change, the installation automatically corrects for these changes.

In the operation of the valves, it should be particularly noted that the valves are not opened by the pressure in the annulus 18 alone, but the force exerted by the bellows internal pressure change in the direction of closing movement of the valves is opposed by the pressure in the annulus, so that the springs 70 are compressed to apply a force tending to open the valves, thus placing the mechanism in cocked or loaded condition for the valves to open when the opening pressure on the valves exerted by the column of liquid in the tubing rises to a predetermined value. Upon the opening of a valve of the tubing, the inflow of gas from the annulus into the tubing results in a reduction in the pressure in the annulus, whereupon gas under pressure from the source of such gas flows into the annulus through the choke 14 to restore the pressure in the annulus.

It will be readily apparent that by properly adjusting the valves in each of the tubings T and T', the well may be produced simultaneously from both of the formations by gas from the same conduit without need for a surface intermitter in most circumstances, and without objectionable "valve interference" that occurs quite frequently in multiple-completed wells produced by prior gas-lift equipment and methods.

Another special value and feature of the valve of FIGURE 9 is its special advantage when used in the conventional arrangement, wherein each valve in the string, is set to close at a lower annulus pressure than the valve above it. Heretofore, in such systems the use of full system pressure in the annulus would cause all valves to open thereby causing complete malfunction of the system.

Inability to use full system pressure means inability to use the full horsepower and energy available and hence means inefficient operation.

With the valve of FIGURE 9 in such a system, the full system pressure can be admitted to the annulus and fully used, with only that valve which has a predetermined liquid head above it opening and then only at the correct and desired time. Efficiencies are thereby drastically increased.

Where installation design warrants the setting of valves in a string to close all at the same pressure, or at ascending pressure as you progress down the string, the same efficiency advantages are obtained since there is still no valve interference either as between valves in a single string or as between valves in multiple strings if such there be.

The invention is disclosed herein in connection with a certain specific embodiment of the gas-lift valve mechanism, but it will be understood that this is intended by way of illustration only and that various changes can be made in the structure and arrangement of the parts within the spirit of the invention and the scope of the appended claims.

Among the changes readily apparent is that of using a stiff enough spring in the valve of FIGURE 3 to operate in normal operating ranges as the valve of FIGURE 9, but retaining the over-ride positive-valve-opening characteristic of the shoulder 66 of the FIGURE 3 embodiment for emergency use upon extra high rise in annulus pressure.

A further change readily apparent is the change from using the annulus for gas supply to using the annulus for production and the tubing for gas supply. Accordingly the claims are drawn using generic language "gas injection conduit" and "producing conduit" for the particular path of the gas injection and the oil produced, respectively. "Fluid" is generic to both gases and liquids and "gas" is used in the physicist's generic sense to include all gaseous matter and not just hydrocarbon gases. The valve cage (a portion of which is illustrated at 52) may more generally be thought of simply as a carrier for the valve member 50 itself. And that which is illustrated as a housing of tubular section 20 and 22 form could be a mandrel or chassis not surrounding the entire works and hence may more generally be referred to as a chassis. In a similar vein "urging means" and "resilient means" includes springs, rubber bands, bellows, magnetic means and other yieldable but urging devices familiar to the arts.

It will thus be seen that the invention constructed and operated as described above, provides gas-lift mechanism which may be applied to individual wells and regulated to produce a maximum of outflow from the well with a minimum expenditure of gas. The invention also makes it possible to use a relatively low volume source of gas under pressure, so that large volumes of gas at high pressure are not necessary for the satisfactory operation of the well.

I claim:

1. In combination with producing wells and related well flow apparatus comprising
  a well borehole penetrating the earth to a producing formation,
  at least one tubing extending into said borehole whereby there is formed within said borehole both
    at least one producing conduit in fluid communication with said producing formation and
    a gas injection conduit connectable to a source of gas under pressure;
  at least one valve mechanism affording fluid communication between said gas injection conduit and said producing conduit and comprising:
    a valve housing secured to said tubing and defining a valve chamber therein,
      said valve housing having at least one inlet port therein in fluid communication with said gas injection conduit,
      said valve housing having a valve seat therein defining an outlet port in fluid communication with said producing conduit,
    valve carrier means movable in response to variations in pressure in said gas injection conduit and mounted in said housing for reciprocal movement with respect to said housing and seat in directions toward and away from said seat in response to such pressure variations,
    a valve member mounted upon said valve carrier for reciprocal movement relative to said valve carrier toward and away from said seat between a first normally disposed extreme position and a second position with respect to said carrier and thus capable of movements both with and in response to movements of said carrier and independently of said carrier in directions toward and away from said seat,
    one extremity of reciprocal movement of said valve member being in contact with said seat whereby said outlet port is closed and the other positions of said valve member in its movements being away from said seat whereby said outlet port is open to afford fluid communication between said gas injection conduit and said producing conduit.

2. In combination with producing wells and related well flow apparatus comprising
  a well borehole penetrating the earth to a producing formation,
  at least one tubing extending into said borehole whereby there is formed within said borehole both
    at least one producing conduit in fluid communication with said producing formation and
    a gas injection conduit connectable to a source of gas under pressure;
  at least one valve mechanism affording fluid communication between said gas injection conduit and said producing conduit and comprising:
    a valve chassis secured to said tubing,
      said valve chassis having a valve seat therein defining a port in fluid communication on one side with said producing conduit and on the other side with said gas injection conduit,
    valve-closing actuator means responsive to variations in pressure in said gas injection conduit and mounted for reciprocal movement with respect to said seat in directions toward and away from said seat in response to such pressure variations,
    a valve member mounted for reciprocal movements with and in response to movements of said valve-closing actuator and also independently of said actuator in directions toward and away from said seat,
    one extremity of reciprocal movement of said valve member being in contact with said seat whereby said outlet port is closed and the other positions of said valve member in its movements being away from said seat whereby said outlet port is open to afford fluid communication between said gas injection conduit and said producing conduit.

3. The invention of claim 2 characterized by said actuator being a cage carried upon one end of a pressurized bellows.

4. The invention of claim 2 characterized by the addition of means on said actuator engageable with said valve member for engaging and moving said valve member from said seat upon increase in pressure in said gas injection conduit and resultant movement of said actuator away from said seat.

5. The invention of claim 2 characterized by the addition of
  a shoulder upon said valve member facing said seat and
  a shoulder upon said actuator facing oppositely to and engageable with said valve member shoulder for forcible movement of said valve member by said actuator.

6. The invention of claim 2 characterized by the addition of means resiliently urging said valve member in a direction away from said valve seat.

7. In combination with producing wells and related well flow apparatus comprising
  a well borehole penetrating the earth to a producing formation,
  at least one tubing extending into said borehole whereby there is formed within said borehole both
    at least one producing conduit in fluid communication with said producing formation and
    a gas injection conduit connectable to a source of gas under pressure;
  at least one valve mechanism affording fluid communication between said gas injection conduit and said producing conduit and comprising:
    a valve chassis secured to said tubing,
      said valve chassis having a valve seat therein defining a port in fluid communication on one side with said producing conduit and on the other side with said gas injection conduit,
    a bellows sealed with at least some gas therein and secured to said chassis with one end thereof free for reciprocal movement toward and away from said seat in response to variations in pressure in said gas injection conduit, a valve actuator mounted for reciprocal movement by said bellows toward said seat in response to decrease in pressure in said gas injection conduit and away from said seat in response to increase in pressure in said gas injection conduit,
    said valve actuator having a shoulder facing away from said seat,
a valve member mounted for reciprocal movement relative to said valve actuator in directions toward and away from said seat between a normally disposed position at the extreme away from said seat and a second position wherein said actuator is relative to said valve member further from said seat.

8. The invention of claim 7 characterized by the addition of urging means urging said valve member with respect to said valve actuator in a direction away from said valve seat.

9. The invention of claim 7 characterized by the addition of a shoulder on said actuator and an oppositely facing shoulder on said valve member each engageable with the other whereby upon movement of said actuator to its extreme position away from said seat it forcibly removes said valve member from said seat.

10. A valve having a chassis secured to a conduit;
  said valve chassis having a valve seat therein defining a port having upstream and downstream sides thereof;
  a pressure responsive means mounted upon said chassis and responsive to variations in fluid pressure on the upstream side of said port to move an engagement portion of such pressure responsive means in directions toward and away from said valve seat;
  a valve member movable with respect to said chassis toward and away from closure of said port in said seat whereby said port may be closed by said valve member or opened to afford fluid communication between the upstream and downstream sides thereof;
  said valve member being exposed when on said valve seat to fluid pressures both upstream and downstream of said seat, the differential in which pressures across said valve member urges said valve onto said seat when the upstream pressure is the greater;
  urging means operable upon said valve member to urge said valve member in a direction to open said port;
  said engagement portion of said pressure responsive means being engageable with said valve member to actuate said valve member to close said port upon decrease in upstream fluid pressure;
  said engagement portion being also separable from said valve member for movement in response to maximum normal operating increases in upstream pressure independently of said valve member, leaving said valve member held on seat by differential in upstream fluid pressure over downstream fluid pressure, with said urging means loaded to urge said valve member to the open position;
  whereby upon increase in said downstream pressure to reduce said differential in pressures said urging means is rendered operable to move said valve member to the open position;
  the ports and channels of the gas flow path in and on the downstream side of said port presenting greater impedance to gas flow than the ports and channels of the gas flow path on the upstream side of said valve seat, whereby during normal valve-open times pressure is maintained substantially equal on all sides of said valve member.

11. The invention of claim 10 characterized by the additional feature of
  second engagement means
  operable between
    said pressure responsive means and said valve member after a limited movement of said pressure responsive means with respect to said valve member in a direction away from said seat
to engage said valve member and move it positively with said first engagement portion in response to increase in upstream pressure in a direction away from said seat to open said port.

12. In combination with producing wells and related well flow apparatus comprising
  a well borehole penetrating the earth to a producing formation,
  at least one tubing extending into said borehole whereby there is formed within said borehole both
    at least one producing conduit in fluid communication with said producing formation and
    a gas injection conduit connectable to a source under pressure;
  at least one valve mechanism affording fluid communication between said gas injection conduit and said producing conduit and comprising:
  a valve chassis secured to said tubing,
    said valve chassis having a valve seat therein defining a port connectable on one side into fluid communication with said producing conduit and connectable on the other side into fluid communication with said gas injection conduit;
  a pressure responsive means mounted upon said chassis and responsive to variations in pressure in said gas injection conduit;
  a valve actuator secured to said pressure responsive means so as to be movable thereby with respect to said valve seat between extreme positions toward and away from said seat in response to variations in pressure in said gas injection conduit;
  a valve member mounted for movement relative to said valve actuator toward and away from said seat between a first normally disposed extreme position and a second position with respect to said actuator and thus capable of movements with and in response to movements of said actuator and also capable of movements independently of said actuator in directions toward and away from said seat;
  one extremity of movement of said valve member being in contact with said seat whereby said port is closed and the other positions of said valve member in its movements being away from said seat whereby said port is open to afford fluid communication between said gas injection conduit and said producing conduit;
  urging means operable between said valve member and said valve actuator to urge said valve member with respect to said valve actuator in a direction away from said seat;
  the normal extremity of movement of said valve actuator in a direction away from said seat being such when said valve member is upon its seat to load said urging means to resiliently urge said valve member away from said seat while not positively moving said valve member away from said seat.

13. The invention of claim 12 wherein said source of gas under pressure is connected to said gas injection conduit and includes a pressure regulator adapted to cut off flow of gas whenever gas in said gas injection conduit exceeds a predetermined pressure but otherwise to pass gas continuously.

14. The invention of claim 12 characterized by the additional feature of the ports and channels of the gas flow path between said valve seat and said producing conduit presenting more impedance to gas flow than the ports and channels of the gas flow path within said valve means upstream from said valve seat.

15. In combination with
  a well borehole penetrating the earth to each of at least two different liquid producing formations and related apparatus comprising
    a tubing for each of said producing formations extending into said borehole whereby there is formed within said borehole both a producing conduit in fluid communication with each said producing formation and a gas injection conduit connectable to a source of gas pressure, and packer means in said borehole isolating each of said producing formations one from another;

a first plurality of valve mechanisms affording fluid communication between said gas injection conduit and one of said producing conduits in a series of vertically spaced-apart down-well locations;

a second plurality of valve mechanisms affording fluid communication between said gas injection conduit and a second of said producing conduits in a series of vertically spaced-apart down-well locations;

the use as the valve mechanism in at least one of said pluralities of valve mechanisms, of a valve mechanism having the following features:

a valve chassis secured to said tubing, said valve chassis having a valve seat therein defining a port connectable on one side into fluid communication with said producing conduit and connectable on the other side into fluid communication with said gas injection conduit;

a pressure responsive means mounted upon said chassis and responsive to variations in pressure in said gas injection conduit;

a valve actuator secured to said pressure responsive means so as to be movable thereby with respect to said valve seat between extreme positions toward and away from said seat in response to variations in pressure in said gas injection conduit;

a valve member mounted for movement relative to said valve actuator toward and away from said seat between a first normally disposed extreme position and a second position with respect to said actuator and thus capable of movements with and in response to movements of said actuator and also capable of movements independently of said actuator in directions toward and away from said seat;

one extremity of movement of said valve member being in contact with said seat whereby said port is closed and the other positions of said valve member in its movements being away from said seat whereby said port is open to afford fluid communication between said gas injection conduit and said producing conduit;

urging means operable between said valve member and said valve actuator to urge said valve member with respect to said valve actuator in a direction away from said seat;

the normal extremity of movement of said valve actuator in a direction away from said seat being such when said valve member is upon its seat to load said urging means to resiliently urge said valve member away from said seat while not positively moving said valve member away from said seat.

16. The invention of claim 15 wherein said source of gas under pressure is connected to said gas injection conduit and includes a pressure regulator adapted to cut off flow of gas whenever gas in said gas injection conduit exceeds a predetermined pressure but otherwise to pass gas continuously into said gas injection conduit.

17. The invention of claim 15 wherein said source of gas under pressure is connected to said gas injection conduit and wherein there is in the proximity of the environs of the top of said gas injection conduit a simple choke effective to produce a predetermined degree of control over the gas flow into said gas injection conduit.

18. The invention of claim 15 characterized by the addition in said borehole of a second packer means isolating said gas injection conduit from the uppermost of said producing formations.

19. The invention of claim 15 characterized by the additional feature of the gas flow path between said valve seat and said producing conduit presenting more impedance to gas flow than the gas flow path with said valve mechanism upstream from said valve seat.

20. A valve having a chassis secured to a conduit;

said valve chassis having a valve seat therein defining a port having upstream and downstream sides thereof;

a pressure responsive means mounted upon said chassis and responsive to variations in fluid pressure on the upstream side of said port to move an engagement portion of such pressure responsive means in directions toward and away from said valve seat;

a valve member movable with respect to said chassis toward and away from closure of said port in said seat whereby said port may be closed by said valve member or opened to afford fluid communication between the upstream and downstream sides thereof;

said valve member being exposed when on said valve seat to fluid pressures both upstream and downstream of said seat, the differential in which pressures across said valve member urges said valve onto said seat when the upstream pressure is the greater;

urging means operable upon said valve member to urge said valve member in a direction to open said port;

said engagement portion of said pressure responsive means being engageable with said valve member to actuate said valve member to close said port upon decrease in upstream fluid pressure;

said engagement portion being also separable from said valve member for movement in response to maximum normal operating increases in upstream pressure independently of said valve member, leaving said valve member held on seat by differential in upstream fluid pressure over downstream fluid pressure with said urging means loaded to urge said valve member to the open position;

whereby upon increase in said downstream pressure to reduce said differential in pressures said urging means is rendered operable to move said valve member to the open position.

21. In combination with a well borehole penetrating the earth to each of at least two different liquid producing formations and related apparatus comprising a tubing for each of said producing formations extending into said borehole whereby there is formed within said borehole both a producing conduit in fluid communication with each said producing formation and a gas injection conduit connectable to a source of gas under pressure, and packer means in said borehole isolating each of said producing formations one from another;

a first plurality of valve mechanisms affording fluid communication between said gas injection conduit and one of said producing conduits in a series of vertically space-apart down-well locations;

a second plurality of valve mechanisms affording fluid communication between said gas injection conduit and a second of said producing conduits in a series of vertically spaced-apart down-well locations;

at least one valve mechanism in at least one of said pluralities of valve mechanisms being a valve mechanism having the following features:

a valve chassis secured to said tubing;

said valve chassis having a valve seat therein defining a port having upstream and downstream sides thereof;

a pressure responsive means mounted upon said chassis and responsive to variations in fluid pressure on the upstream side of said port to move an engagement
portion of such pressure responsive means in directions toward and away from said valve seat;
a valve member movable with respect to said chassis
toward and away from closure of said port in said
seat whereby said port may be closed by said valve
member or opened to afford fluid communication
between the upstream and downstream sides thereof;
said valve member being exposed when on said valve
seat to fluid pressures both upstream and downstream
of said seat, the differential in which pressures across
said valve member urges said valve onto said seat
when the upstream pressure is the greater;
urging means operable upon said valve member to urge
said valve member in a direction to open said port;
said engagement portion of said pressure responsive
means being engageable with said valve member to
actuate said valve member upon decrease in upstream
fluid pressure to close said port;
said engagement portion being also separable from
said valve member for movement in response to maximum normal operating increases in upstream pressure independently of said valve member, leaving
said valve member held on seat by differential in upstream fluid pressure over downstream fluid pressure
with said urging means loaded to urge said valve
member to the open position;
whereby upon increase in said downstream pressure to
reduce said differential in pressures said urging means
is rendered operable to move said valve member to
the open position;
said valve member when in its normal full open position being surrounded on all sides by substantially
the same pressure and hence being then not urged
significantly in any direction by pressure differential
thereacross.

22. The invention of claim 7 characterized further by
the combination including at least two producing conduits
in the well reaching at least two producing formations, on
each of which producing conduits there is mounted valve
mechanism of the type defined in claim 7.

23. The invention of claim 15 characterized by each
plurality of valve mechanisms comprising at least two
valve mechanisms of the type defined in said claim 15.

24. The invention of claim 21 characterized by each
plurality of valve mechanisms comprising at least two
valve mechanisms of the type defined in said claim 21.

25. In combination with producing wells and related
well flow apparatus comprising
a well borehole penetrating the earth to a producing
formation,
at least one tubing extending into said borehole whereby there is formed within said borehole both
at least one producing conduit in fluid communication with said producing formation and
a gas injection conduit connectable to a source of
gas under pressure;
at least one valve mechanism affording fluid communication between said gas injection conduit and said producing conduit and comprising:
a valve chassis secured to said tubing,
said valve chassis having a valve seat therein defining a
port connectable on one side into fluid communication with said producing conduit and connectable on
the other side into fluid communication with said gas
injection conduit;
a valve member adapted at times to close said port and
at times not to close said port,
said valve member while in the closed position being
exposed on one side thereof to the pressure in said
producing conduit and on the other side thereof to
the pressure in said gas injection conduit whereby a
force is generated urging said member toward said
seat,
said valve member upon its normal opening to its full
open position being surrounded by the pressure in
said chassis substantially to the exclusion of responsiveness to pressure in said producing conduit,
whereby immediately after opening of said valve member the pressure differential urging it to close is substantially dissipated;
a pressure responsive means mounted upon said chassis
and responsive to decrease in pressure in the gas injection conduit to permit termination of gas flow through
said valve chassis;
said pressure responsive means being sufficiently independent of said valve member as to be incapable
throughout the length of its normal movement in response to increase in pressure in said gas injection
conduit, of positive movement of said valve member;
the commencement of such termination of gas flow
through said chassis,
because of response of said pressure responsive means to
decrease in injection conduit pressure,
producing across said valve member
a pressure differential between gas injection conduit
pressure on one side and a lower pressure on the
other side,
which differential tends to urge said valve member to
seat;
an urging means operable to urge said valve member toward the open position and functioning in opposition
to said pressure differential;
whereby said valve mechanism is incapable of being
opened by gas injection conduit pressure alone but
rather opens in response to the combination of said
urging means and the pressure differential between gas
injection conduit and producing conduit,
and whereby said valve mechanism when once open terminates the flow of gas into said producing conduit
substantially solely in response to reduction in said gas
injection conduit pressure.

26. In combination with producing wells and related
well flow apparatus comprising
a well borehole penetrating the earth to a producing
formation,
at least one tubing extending into said borehole whereby there is formed within said borehole both
at least one producing conduit in fluid communication with said producing formation and
a gas injection conduit connectable to a source of
gas under pressure;
at least one valve mechanism according fluid communication between said gas injection conduit and said producing conduit and comprising:
a valve chassis secured to said tubing,
said valve chassis having a valve seat therein defining
a port connectable on one side into fluid communication with said producing conduit and connectable on
the other side into fluid communication with said
gas injection conduit;
a valve member adapted at times to close said port and
at times not to close said port,
said valve member while in the closed position being
exposed on one side thereof to the pressure in said
producing conduit and on the other side thereof to
the pressure in said gas injection conduit whereby
a force is generated urging said member toward said
seat,
said valve member upon its normal opening to its full
open position being surrounded by the pressure in
said chassis substantially to the exclusion of responsiveness to pressure in said producing conduit,
whereby immediately after opening of said valve member the pressure differential urging it to close is substantially dissipated;
a pressure responsive means mounted upon said chassis
and responsive to decrease in pressure in the gas injection conduit to permit termination of gas flow
through said valve chassis;

said pressure responsive means being sufficiently independent of said valve member as to be incapable throughout the length of its normal movement in response to increase in pressure in said gas injection conduit, of positive movement of said valve member;
the commencement of such termination of gas flow through said chassis,
because of response of said pressure responsive means to decrease in injection conduit pressure, producing across said valve member
a pressure differential between gas injection conduit pressure on one side and a lower pressure on the other side,
which differential tends to urge said valve member to seat;
an urging means operable to urge said valve member toward the open position and functioning in opposition to said pressure differential thereacross.
said urging means being loaded to urge said valve member toward the open position after the operation of said pressure responsive means to produce termination of gas flow through said valve chassis;
whereby said valve mechanism is incapable of being opened by gas injection conduit pressure alone but rather opens in response to the combination of said resilient means and the pressure differential between gas injection conduit and producing conduit,
and whereby said valve mechanism when once open terminates the flow of gas into said producing conduit substantially solely in response to reduction in said gas injection conduit pressure.

27. In combination with
a well borehole penetrating the earth to each of at least two different liquid producing formations and related apparatus comprising
a tubing for each of said producing formations extending into said borehole whereby there is formed within said borehole both
a producing conduit in fluid communication with each said producing formation and
a gas injection conduit connectable to a source of gas under pressure, and
packer means in said borehole isolating each of said producing formations one from another;
a first plurality of valve mechanisms affording fluid communication between said gas injection conduit and one of said producing conduits in a series of vertically spaced-apart down-well locations;
a second plurality of valve mechanisms affording fluid communication between said gas injection conduit and a second of said producing conduits in a series of vertically spaced-apart down-well locations;
at least one valve mechanism in at least one of said pluralities of valve mechanisms being a valve mechanism having the following features:
a valve chassis secured to said tubing,
said valve chassis having a valve seat therein defining a port connectable on one side into fluid communication with said producing conduit and connectable on the other side into fluid communication with said gas injection conduit;
a valve member adapted at times to close said port and at times not to close said port,
said valve member while in the closed position being exposed on one side thereof to the pressure in said producing conduit and on the other side thereof to the pressure in said gas injection conduit whereby a force is generated urging said member toward said seat,
said valve member upon its normal opening to its full open position being surrounded by the pressure in said chassis substantially to the exclusion of responsiveness to pressure in said producing conduit,
whereby immediately after opening of said valve member the pressure differential urging it to close is substantially dissipated;
a pressure responsive means mounted upon said chassis and responsive to decrease in pressure in the gas injection conduit to permit termination of gas flow through said valve chassis;
said pressure responsive means being sufficiently independent of said valve member as to be incapable throughout the length of its normal movement in response to increase in pressure in said gas injection conduit, of positive movement of said valve member;
the commencement of such termination of gas flow through said chassis,
because of response of said pressure responsive means to decrease in injection conduit pressure, producing across said valve member
a pressure differential between gas injection conduit pressure on one side and pressure derived from producing conduit pressure on the other side,
which differential tends to urge said valve member to seat;
an urging means operable to urge said valve member toward the open position and functioning in opposition to said pressure differential thereacross;
whereby said valve mechanism is incapable of being opened by gas injection conduit pressure alone but rather opens in response to the combination of said urging means and the pressure differential between gas injection conduit and producing conduit,
and whereby said valve mechanism when once open terminates the flow of gas into said producing conduit substantially solely in response to reduction in said gas injection conduit pressure.

28. In combination with
a well borehole penetrating the earth to each of at least two different liquid producing formations and related apparatus comprising
a tubing for each of said producing formations extending into said borehole whereby there is formed within said borehole both
a producing conduit in fluid communication with each said producing formation and
a gas injection conduit connectable to a source of gas under pressure, and
packer means in said borehole isolating each of said producing formations one from another;
a first plurality of valve mechanisms affording fluid communication between said gas injection conduit and one of said producing conduits in a series of vertically spaced-apart down-well locations;
a second plurality of valve mechanisms affording fluid communication between said gas injection conduit and a second of said producing conduits in a series of vertically spaced-apart down-well locations;
at least one valve mechanism in at least one of said pluralities of valve mechanisms being a valve mechanism having the following features:
a valve chassis secured to said tubing,
said valve chassis having a valve seat therein defining a port connectable on one side into fluid communication with said producing conduit and connectable on the other side into fluid communication with said gas injection conduit;
a valve member adapted at times to close said port and at times not to close said port,
said valve member while in the closed position being exposed on one side thereof to the pressure in said producing conduit and on the other side thereof to the pressure in said gas injection conduit whereby a force is generated urging said member toward said seat,
said valve member upon its normal opening to its full open position being surrounded by the pressure in said chassis substantially to the exclusion of responsiveness to pressure in said producing conduit, whereby immediately after opening of said valve member the pressure differential urging it to close is substantially dissipated;

a pressure responsive means mounted upon said chassis and responsive to decrease in pressure in the gas injection conduit to permit termination of gas flow through said valve chassis;

said pressure responsive means being sufficiently independent of said valve member as to be incapable throughout the length of its normal movement in response to increase in pressure in said gas injection conduit, of positive movement of said valve member;

the commencement of such termination of gas flow through said chassis, because of response of said pressure responsive means to decrease in injection conduit pressure, producing across said valve member a pressure differential between gas injection conduit pressure on one side and pressure derived from producing conduit pressure on the other side, which differential tends to urge said valve member to seat;

an urging means operable to urge said valve member toward the open position and functioning in opposition to said pressure differential thereacross, said urging means being loaded to urge said valve member toward the open position after the operation of said pressure responsive means to produce termination of gas flow through said valve chassis;

whereby said valve mechanism is incapable of being opened by gas injection conduit pressure alone but rather opens in response to the combination of said urging means and the pressure differential between gas injection conduit and producing conduit, and whereby said valve mechanism when once open terminates the flow of gas into said producing conduit substantially solely in response to reduction in said gas injection conduit pressure.

29. In a gas lift valve having a chassis having a valve seat therein defining a port with upstream and downstream sides thereof, and a valve member adapted at times to close said port and at times to open said port, the combination comprising:

a valve carrier means responsive to variations in pressure on said upstream side of said port and mounted upon said chassis for reciprocal movement with respect to said seat in directions toward and away from said seat in response to such pressure variations;

said valve member being mounted upon said valve carrier for reciprocal movement relative to said valve carrier toward and away from said seat; and permanent magnetic means tending to hold said valve carrier in its position removed from said seat when once in that removed position.

30. In a gas lift valve comprising a chassis having a valve seat therein defining a port with upstream and downstream sides thereof and a valve member adapted at times to close said port and at times to leave said port open, permanent magnetic means adapted to magnetically urge said valve member to remain in its full open position when once it is fully opened.

31. In a gas lift valve comprising a chassis having a valve seat therein defining a port with upstream and downstream sides thereof and a valve member adapted at times to close said port and at times to leave said port open, permanent magnetic means adapted to magnetically urge said valve member to remain in its closed position when once it is closed.

32. The invention of claim 27 characterized by each plurality of valve mechanisms comprising at least two valve mechanisms of the type defined in said claim 27.

33. The invention of claim 28 characterized by each plurality of valve mechanisms comprising at least two valve mechanisms of the type defined in said claim 28.

References Cited by the Examiner

UNITED STATES PATENTS

| | | | |
|---|---|---|---|
| 2,262,752 | 11/41 | Boynton | 103—232 |
| 2,633,086 | 3/53 | Zaba | 103—233 |
| 2,672,827 | 3/54 | McGowen | 137—155 |
| 2,869,475 | 1/59 | Bobo | 103—233 |

KARL J. ALBRECHT, *Primary Examiner.*

JOSEPH H. BRANSON, JR., *Examiner.*

UNITED STATES PATENT OFFICE
CERTIFICATE OF CORRECTION

Patent No. 3,175,514                                March 30, 1965

Everett D. McMurry

It is hereby certified that error appears in the above numbered patent requiring correction and that the said Letters Patent should read as corrected below.

Column 3, line 8, for "gas-shift" read -- gas-lift --; column 5, line 7, for "value" read -- valve --; column 9, line 61, for "charge" read -- charged --; column 18, lines 13 and 14, for "source under pressure" read -- source of gas under pressure --; column 19, line 6, for "gas pressure" read -- gas under pressure --; column 20, line 61, for "space-apart" read -- spaced-apart --.

Signed and sealed this 21st day of September 1965.

(SEAL)
Attest:

ERNEST W. SWIDER
Attesting Officer

EDWARD J. BRENNER
Commissioner of Patents